(12) United States Patent
Park et al.

(10) Patent No.: US 9,178,208 B2
(45) Date of Patent: Nov. 3, 2015

(54) COMPOSITE MATERIALS FOR ELECTROCHEMICAL STORAGE

(75) Inventors: Benjamin Park, Irvine, CA (US); Alexander Gorkovenko, Mission Viejo, CA (US); Rabih Zaouk, Costa Mesa, CA (US); William Schank, Howell, MI (US); Genis Turon Teixidor, Fullerton, CA (US); Lothar Steffens, Irvine, CA (US)

(73) Assignee: EVEVATE CORPORATION, Irvine, CA (US)

( * ) Notice: Subject to any disclaimer, the term of this patent is extended or adjusted under 35 U.S.C. 154(b) by 348 days.

(21) Appl. No.: 13/008,800

(22) Filed: Jan. 18, 2011

(65) Prior Publication Data

US 2011/0177393 A1  Jul. 21, 2011

Related U.S. Application Data

(60) Provisional application No. 61/295,993, filed on Jan. 18, 2010, provisional application No. 61/315,845, filed on Mar. 19, 2010.

(51) Int. Cl.
*H01M 4/88* (2006.01)
*H01M 4/13* (2010.01)
(Continued)

(52) U.S. Cl.
CPC ............... *H01M 4/13* (2013.01); *B82Y 30/00* (2013.01); *C04B 35/522* (2013.01);
(Continued)

(58) Field of Classification Search
CPC . H01M 10/052; C04B 2235/80; Y02E 10/122
USPC ............ 252/502, 182.1; 429/188, 231.8, 307, 429/218.1; 257/43, 655; 442/301
See application file for complete search history.

(56) References Cited

U.S. PATENT DOCUMENTS 3,990,098 A * 11/1976 Mastrangelo .................. 257/43
5,624,606 A    4/1997 Wilson et al.
(Continued)

FOREIGN PATENT DOCUMENTS

EP    1 722 429    11/2006
EP    2 113 955    11/2009
(Continued)

OTHER PUBLICATIONS

Choi, et al. Enhanced electrochecmical properties of a Si-based anode using an electrochemically active polyamide imide binder, Journal of Power Sources, 2008, vol. 177, pp. 590-594.
(Continued)

*Primary Examiner* — Khanh Tuan Nguyen
(74) *Attorney, Agent, or Firm* — Knobbe, Martens, Olson & Bear LLP

(57) ABSTRACT

Composite materials and methods of forming composite materials are provided. The composite materials described herein can be utilized as an electrode material for a battery. In certain embodiments, the composite material includes greater than 0% and less than about 90% by weight silicon particles, and greater than 0% and less than about 90% by weight of one or more types of carbon phases. At least one of the one or more types of carbon phases can be a substantially continuous phase. The method of forming a composite material can include providing a mixture that includes a precursor and silicon particles, and pyrolyzing the precursor to convert the precursor into one or more types of carbon phases to form the composite material.

24 Claims, 16 Drawing Sheets

(51) Int. Cl.
| | |
|---|---|
| *B82Y 30/00* | (2011.01) |
| *C04B 35/524* | (2006.01) |
| *C04B 35/532* | (2006.01) |
| *H01M 4/139* | (2010.01) |
| *H01M 4/38* | (2006.01) |
| *H01M 4/587* | (2010.01) |
| *C04B 35/52* | (2006.01) |
| *C04B 35/622* | (2006.01) |
| *C04B 35/626* | (2006.01) |
| *C04B 35/83* | (2006.01) |
| *H01M 10/052* | (2010.01) |

(52) U.S. Cl.
CPC ............ *C04B 35/524* (2013.01); *C04B 35/532* (2013.01); *C04B 35/6269* (2013.01); *C04B 35/62218* (2013.01); *C04B 35/62635* (2013.01); *C04B 35/83* (2013.01); *H01M 4/139* (2013.01); *H01M 4/38* (2013.01); *H01M 4/587* (2013.01); *C04B 2235/422* (2013.01); *C04B 2235/425* (2013.01); *C04B 2235/428* (2013.01); *C04B 2235/48* (2013.01); *C04B 2235/5248* (2013.01); *C04B 2235/5288* (2013.01); *C04B 2235/80* (2013.01); *H01M 10/052* (2013.01); *Y02E 60/122* (2013.01)

(56) References Cited

U.S. PATENT DOCUMENTS

| | | | |
|---|---|---|---|
| 6,287,728 B1 | 9/2001 | Kajiura et al. | |
| 6,300,013 B1 | 10/2001 | Yamada et al. | |
| 6,413,672 B1 | 7/2002 | Suzuki et al. | |
| 6,432,579 B1 | 8/2002 | Tsuji et al. | |
| 6,436,576 B1 | 8/2002 | Hossain | |
| 6,489,061 B1 | 12/2002 | Hossain | |
| 6,589,696 B2 | 7/2003 | Matsubara et al. | |
| 6,770,399 B2 | 8/2004 | Umeno et al. | |
| 6,946,223 B2 | 9/2005 | Kusumoto et al. | |
| 6,949,314 B1 | 9/2005 | Hossain | |
| 7,037,581 B2 | 5/2006 | Aramata et al. | |
| 7,202,000 B2 | 4/2007 | Iriyama et al. | |
| 7,303,838 B2 | 12/2007 | Morita et al. | |
| 7,316,792 B2 | 1/2008 | Kosuzu et al. | |
| 7,615,314 B2 | 11/2009 | Kawakami et al. | |
| 7,670,970 B2 * | 3/2010 | Ko | 442/301 |
| 8,709,653 B2 | 4/2014 | Lee et al. | |
| 2004/0137327 A1 | 7/2004 | Gross et al. | |
| 2005/0233213 A1* | 10/2005 | Lee et al. | 429/218.1 |
| 2006/0035149 A1 | 2/2006 | Nanba et al. | |
| 2006/0040182 A1 | 2/2006 | Kawakami et al. | |
| 2006/0051670 A1 | 3/2006 | Aramata et al. | |
| 2006/0051675 A1 | 3/2006 | Musha et al. | |
| 2006/0127773 A1 | 6/2006 | Kawakami et al. | |
| 2006/0134516 A1 | 6/2006 | Im et al. | |
| 2006/0147802 A1 | 7/2006 | Yasuda et al. | |
| 2006/0275668 A1 | 12/2006 | Peres et al. | |
| 2007/0054190 A1 | 3/2007 | Fukui et al. | |
| 2007/0072084 A1 | 3/2007 | Mishie et al. | |
| 2007/0077490 A1 | 4/2007 | Kim et al. | |
| 2007/0154811 A1 | 7/2007 | Oh et al. | |
| 2007/0212610 A1 | 9/2007 | Sonobe et al. | |
| 2007/0243469 A1 | 10/2007 | Kim et al. | |
| 2007/0281216 A1 | 12/2007 | Petrat et al. | |
| 2008/0020282 A1 | 1/2008 | Kim et al. | |
| 2008/0145757 A1 | 6/2008 | Mah et al. | |
| 2008/0145761 A1 | 6/2008 | Petrat et al. | |
| 2008/0160409 A1 | 7/2008 | Ishida et al. | |
| 2008/0280207 A1 | 11/2008 | Patoux et al. | |
| 2008/0286657 A1 | 11/2008 | Hasegawa et al. | |
| 2009/0004566 A1 | 1/2009 | Shirane et al. | |
| 2009/0029256 A1 | 1/2009 | Mah et al. | |
| 2009/0053608 A1 | 2/2009 | Choi et al. | |
| 2009/0087743 A1 | 4/2009 | Kim et al. | |
| 2009/0117467 A1 | 5/2009 | Zhamu et al. | |
| 2009/0117468 A1 | 5/2009 | Eom | |
| 2009/0181304 A1 | 7/2009 | Miyamoto et al. | |
| 2009/0202911 A1 | 8/2009 | Fukuoka et al. | |
| 2009/0239151 A1 | 9/2009 | Nakanishi et al. | |
| 2009/0283875 A1* | 11/2009 | Garandet et al. | 257/655 |
| 2009/0317722 A1 | 12/2009 | Watanabe | |
| 2010/0078599 A1* | 4/2010 | Kumta et al. | 252/502 |
| 2010/0143798 A1 | 6/2010 | Zhamu et al. | |
| 2010/0266902 A1 | 10/2010 | Takano et al. | |
| 2011/0020701 A1 | 1/2011 | Park et al. | |

FOREIGN PATENT DOCUMENTS

| | | |
|---|---|---|
| JP | 2001-006682 | 1/2001 |
| JP | 2005-285382 | 10/2005 |
| WO | WO 2011/088472 | 7/2011 |

OTHER PUBLICATIONS

Datta, et al., Silicon, graphite and resin based hard carbon nanocomposite anodes for lithium ion batteries, Journal of Power Sources, Feb. 10, 2007, vol. 165, Issue 1, pp. 368-378.

Jeong, K. Lee, et al., Silicon nanoparticles-graphene paper composites for Li ion battery anodes, Chemical Communications, 2010, vol. 46, Issue 12, pp. 2025-2027.

Ji, L. et al., Electrospun Carbon Nanofibers Containing Silicon Particles as an Energy-Storage Medium, XP026575029, Elsevier, Oxford, Nov. 1, 2009, vol. 47, Issue 14, pp. 3219-3226.

Lee, J.K., Graphene-silicon composite for li-ion battery anodes, URL: http://apps.aiche.org/proceedings/Abstracts.aspx?PaperID=162914, retrieved on Jun. 23, 2011, Sep. 11, 2009.

Search Report and Written Opinion for International Application No. PCT/US2011/021585 mailed on Jul. 26, 2011 in 15 pages.

International Preliminary Report on Patentability for International Application No. PCT/US2011/021585 mailed on Jun. 28, 2012 in 15 pages.

Wolf, H. et al., Carbon-fiber-silicon nanocomposites for lithium-ion battery anodes by microwave plasma chemical vapor deposition, XP026053254, Elsevier SA, May 1, 2009, vol. 190, Issue 1, pp. 157-161.

Written Opinion for International Application No. PCT/US2011/021585 mailed on May 3, 2012 in 8 pages.

Hsu, G. et al., Fines in Fluidized Bed Silane Pyrolysis, J. Electrochem. Soc.: Solid-State Science and Technology, Mar. 1984, vol. 131, No. 3, pp. 660-663.

Search Report and Written Opinion for International Application No. PCT/US2014/019683 mailed May 30, 2014 in 13 pages.

* cited by examiner

COMPOSITE MATERIALS FOR ELECTROCHEMICAL STORAGE

CROSS-REFERENCE TO RELATED APPLICATIONS

This application claims the benefit of U.S. Provisional Application Nos. 61/295,993, filed Jan. 18, 2010, and 61/315,845, filed Mar. 19, 2010, the entirety of each of which is hereby incorporated by reference.

BACKGROUND

1. Field of the Invention

The present invention relates to composite materials that include silicon and carbon. In particular, the present invention relates to composite materials for use in battery electrodes.

2. Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electrochemically active material layers on electrically conductive metals (e.g., aluminum and copper). Films can be rolled or cut into pieces which are then layered into stacks. The stacks are of alternating electro-chemically active materials with the separator between them.

SUMMARY OF THE INVENTION

In certain embodiment, a composite material is provided. The composite material can include greater than 0% and less than about 90% by weight silicon particles and greater than 0% and less than about 90% by weight of one or more types of carbon phases. Furthermore, at least one of the one or more types of carbon phases is a substantially continuous phase.

The silicon particles may have an average largest dimension less than about 1 μm. In some embodiments, the silicon particles include about 20% to about 80% by weight of the composite material.

The at least one of the one or more types of carbon phases that is a substantially continuous phase can be electrochemically active and electrically conductive. In some embodiments, the at least one of the one or more types of carbon phases that is a substantially continuous phase includes hard carbon.

The composite material may also include other particles. For example, the one or more types of carbon phases can include graphite particles. The composite material may include conductive particles, metal particles, etc.

The composite material can be substantially electrochemically active. Furthermore, the composite material may be self-supported. In certain embodiments, a battery electrode that includes the composite material describe herein is provided.

In certain embodiments, a method of using a composite material described herein is provided. The method can include using the composite material only at a gravimetric capacity less than about 70% of a maximum gravimetric capacity of the composite material.

In certain embodiments, a method of forming a composite material is provided. The method can include providing a mixture comprising a precursor and silicon particles, and pyrolysing the precursor to convert the precursor into one or more types of carbon phases to form the composite material.

After pyrolysing the precursor, the mixture may form a self-supported composite structure. At least one of the one or more types of carbon phases can be a substantially continuous phase. The at least one of the one or more types of carbon phases that is a substantially continuous phase can include hard carbon. In some embodiments, the silicon particles include about 20% to about 80% by weight of the composite material. In further embodiments, the silicon particles include greater than 0% and less than about 80% by weight in the mixture and the precursor comprises about 5% and less than about 80% by weight in the mixture.

The mixture may further include a solvent. The precursor can include a hydrocarbon compound, polyimide, phenolic resin, etc. The method can further include casting the mixture on a substrate, drying the mixture to form a film, removing the film from the substrate, and curing the film in a hot press. The method may also include forming a battery electrode from the composite material.

DETAILED DESCRIPTION

Figure 1:
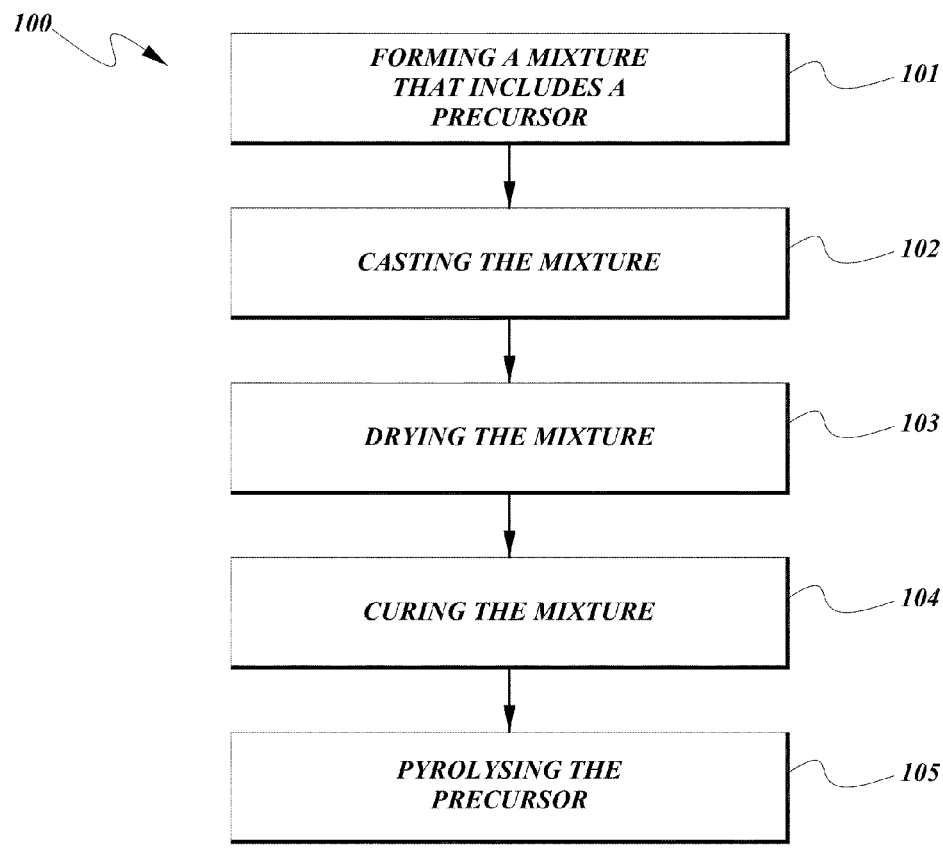
FIG. 1 illustrates an embodiment of a method of forming a composite material that includes forming a mixture that includes a precursor, casting the mixture, drying the mixture, curing the mixture, and pyrolyzing the precursor.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. Because of this expansion, anodes including silicon should be able to expand for the silicon to maintain electrical contact with the silicon.

This application also describes a new method of creating monolithic, self-supported anodes using a carbonized polymer. Because the polymer is converted into a electrically conductive and electrochemically active matrix, the resulting electrode is conductive enough that a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely (or almost entirely) of active material.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may not be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

FIG. 1 illustrates one embodiment of a method of forming a composite material 100. For example, the method of forming a composite material can include forming a mixture including a precursor, block 101. The method can further include pyrolyzing the precursor to convert the precursor to a carbon phase. The precursor mixture may include carbon additives such as graphite active material, chopped or milled carbon fiber, carbon nanofibers, carbon nanotubes, and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles may be distributed throughout the composite material. Advantageously, the carbonized precursor will be a structural material as well as an electro-chemically active and electrically conductive material. In certain embodiments, material particles added to the mixture are homogenously distributed throughout the composite material to form a homogeneous composite.

The mixture can include a variety of different components. The mixture can include one or more precursors. In certain embodiments, the precursor is a hydrocarbon compound. For example, the precursor can include polyamic acid, polyimide, etc. Other precursors include phenolic resins, epoxy resins, and other polymers. The mixture can further include a solvent. For example, the solvent can be N-methyl-pyrollidone (NMP). Other possible solvents include acetone, diethyl ether, gamma butyrolactone, isopropanol, dimethyl carbonate, ethyl carbonate, dimethoxyethane, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrollidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a substrate, block 102 in FIG. 1. In some embodiments, casting includes using a gap extrusion or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a polymer sheet, a polymer roll, or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In certain embodiments, the dried mixture is a film or sheet. In some embodiments, the dried mixture is cured, block 104. A hot press can be used to cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In other embodiments, there is no substrate for casting and the anode film does not need to be removed from any substrate. The dried mixture may be cut or mechanically sectioned into smaller pieces.

The mixture further goes through pyrolysis to convert the precursor to carbon, block 105. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein is a continuous process. For example, casting, drying, curing and pyrolysis can be performed in a continuous process; e.g., the mixture can be coated onto a glass or metal cylinder. The mixture can be dried while rotating on the cylinder creating a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material. Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon losses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can ensure that electrical contact to the surface of the silicon is not lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

Embodiments of a largest dimension of the silicon particles includes less than about 40 µm, less than about 1 µm, between about 10 nm and 40 µm, between about 10 nm and 1 µm, less than about 500 nm, less than about 100 nm, and about 100 nm. All, substantially all, or at least some of the silicon particles may comprise the largest dimension described above. For example, an average or median largest dimension of the silicon particles include less than about 40 µm, less than about 1 µm, between about 10 nm and 40 µm, between about 10 nm and 1 µm, less than about 500 nm, less than about 100 nm, and about 100 nm. The amount of silicon in the composite material can be greater than zero percent by weight of the mixture and composite material. In certain embodiments, the amount of silicon in the mixture is between greater than 0% and less than about 90% by weight or between about 30% and about 80% by weight of the mixture. Embodiments of the amount of silicon in the composite material include greater than 0% and less than about 35% by weight, greater than 0% and less than about 25% by weight, between about 10 and about 35% by weight, and about 20% by weight. In further certain embodiments, the amount of silicon in the mixture is at least about 30% by weight. Additional embodiments of the amount of silicon in the composite material include more than about 50% by weight, between about 30% and about 80% by weight, between about 50% and about 70% by weight, and between about 60% and about 80% by weight. Furthermore, the silicon particles may or may not be pure silicon. For example, the silicon particles may be substantially silicon or may be a silicon alloy. In one embodiment, the silicon alloy includes silicon as the primary constituent along with one or more other elements.

The amount of carbon obtained from the precursor can be about 50 weight percent from polyamic acid. In certain embodiments, the amount of carbon from the precursor in the composite material is about 10 to 25% by weight. The carbon from the precursor can be hard carbon. Hard carbon is a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors include phenolic resins, epoxy resins, and other polymers that have a very high melting point or are crosslinked. Embodiments of the amount of hard carbon in the composite material includes about 10% to about 25% by weight, about 20% by weight, and more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments, graphite particles are added to the mixture. Advantageously, graphite is an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, the average or median largest dimension of the graphite particles is between about 0.5 microns and about 20 microns. In certain embodiments, the mixture includes greater than 0% and less than about 80% by weight graphite particles. In further embodiments, the composite material includes about 40% to about 75% by weight graphite particles.

In certain embodiments, conductive particles which may also be electrochemically active are added to the mixture. Such particles provide both a more electronically conductive composite as well as a more mechanically deformable composite capable of absorbing the large volumetric change incurred during lithiation and de-lithiation. In certain embodiments, the largest dimension of the conductive particles is between about 10 nanometers and about 7 millimeters. All, substantially all, or at least some of the conductive particles may comprise the largest dimension described herein. In further embodiments, the average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolzed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity. For example, the porosity can be about 5% to about 40% by volume porosity.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in a battery or electrochemical cell can include a composite material described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to an gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at an gravimetric capacity below about 70% of the composite material's maximum gravimetric capacity. For example, the composite material is not used at an gravimetric capacity above about 70% of the composite material's maximum gravimetric capacity. In further embodiments, the composite material is used or only used at an gravimetric capacity below about 50% of the composite material's maximum gravimetric capacity or below about 30% of the composite material's maximum gravimetric capacity.

EXAMPLES

The below example processes for anode fabrication generally include mixing components together, casting those components onto a removable substrate, drying, curing, removing the substrate, then pyrolyzing the resulting samples. N-Methyl-2-pyrrolidone (NMP) was typically used as a solvent to modify the viscosity of any mixture and render it castable using a doctor blade approach.

Example 1

In Example 1, a polyimide liquid precursor (PI 2611 from HD Microsystems corp.), graphite particles (SLP30 from Timcal corp.), conductive carbon particles (Super P from Timcal corp.), and silicon particles (from Alfa Aesar corp.) were mixed together for 5 minutes using a Spex 8000D machine in the weight ratio of 200:55:5:20. The mixture was then cast onto aluminum foil and allowed to dry in a 90° C. oven, to drive away solvents, e.g., NMP. This is followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 15.8% of PI 2611 derived carbon, 57.9% of graphite particles, 5.3% of carbon resulting from Super P, and 21.1% of silicon by weight.

Figure 2:
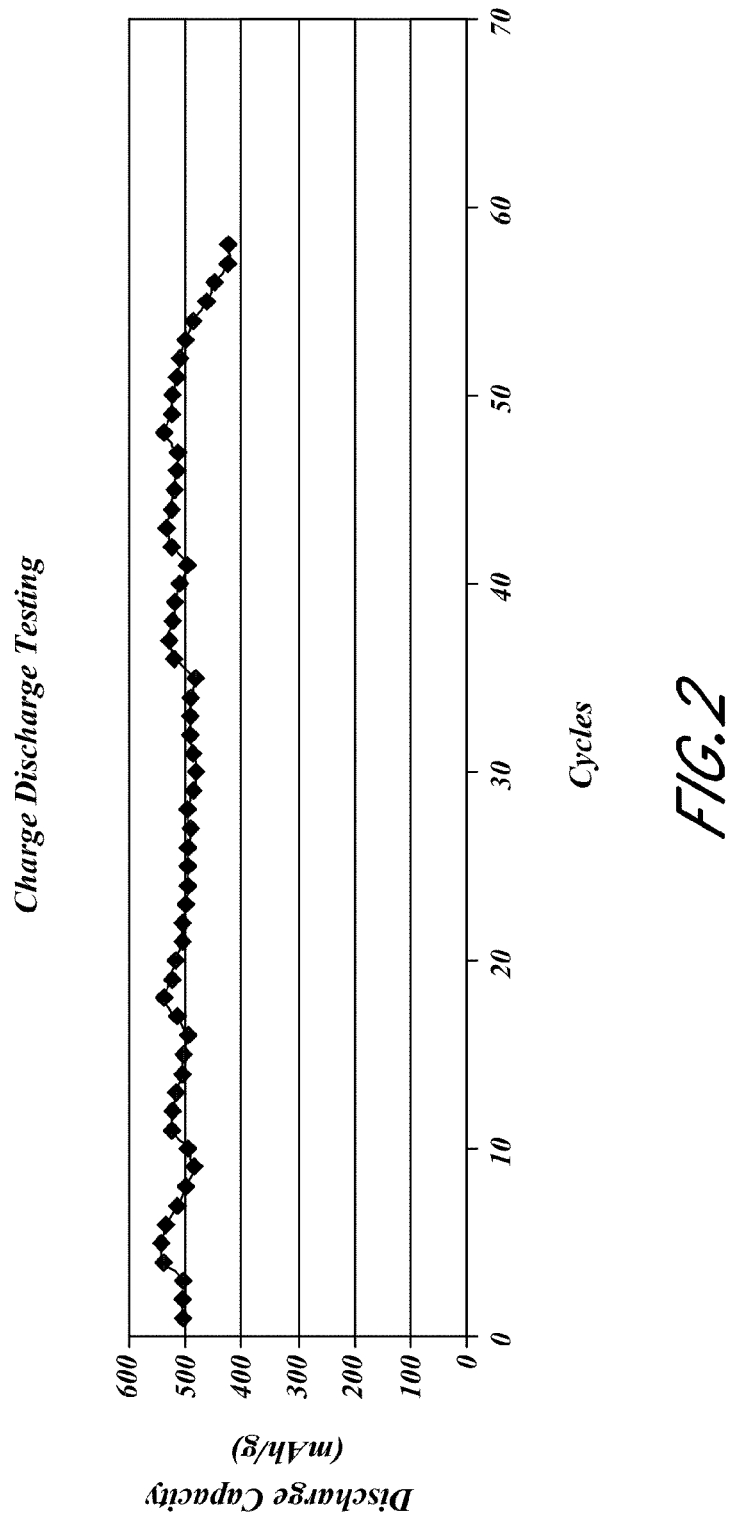
FIG. 2 is a plot of the discharge capacity at an average rate of C/2.6.

The resulting electrodes were then tested in a pouch cell configuration against a lithium NMC oxide cathode. A typical cycling graph is shown in FIG. 2.

Example 2

In Example 2, silicon particles (from EVNANO Advanced Chemical Materials Co., Ltd.) were initially mixed with NMP using a Turbula mixer for a duration of one hour at a 1:9 weight ratio. Polyimide liquid precursor (PI 2611 from HD Microsystems corp.), graphite particles (SLP30 from Timcal corp.), and carbon nanofibers (CNF from Pyrograf corp.) were then added to the Si:NMP mixture in the weight ratio of 200:55:5:200 and vortexed for around 2 minutes. The mixture was then cast onto aluminum foil that was covered by a 21 µm thick copper mesh. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1000° C. under argon. The process resulted in a composition of 15.8% of PI 2611 derived carbon, 57.9% of graphite particles, 5.3% of CNF, and 21.1% of silicon by weight.

Figure 3:
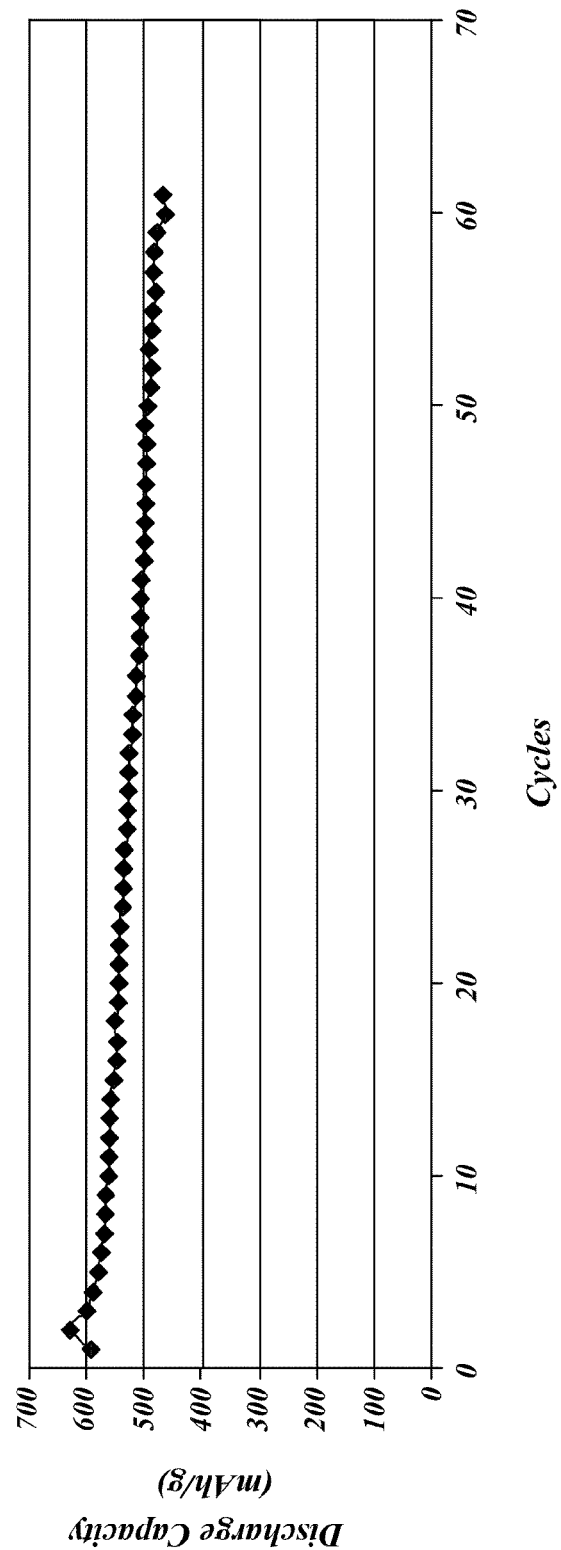
FIG. 3 is a plot of the discharge capacity at an average rate of C/3.

The resulting electrodes were then tested in a pouch cell configuration against a lithium NMC oxide cathode. A typical cycling graph is shown in FIG. 3.

Example 3

In Example 3, polyimide liquid precursor (PI 2611 from HD Microsystems corp.), and 325 mesh silicon particles (from Alfa Aesar corp.) were mixed together using a Turbula mixer for a duration of 1 hour in the weight ratios of 40:1. The mixture was then cast onto aluminum foil and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 75% of PI 2611 derived carbon and 25% of silicon by weight.

Figure 4:
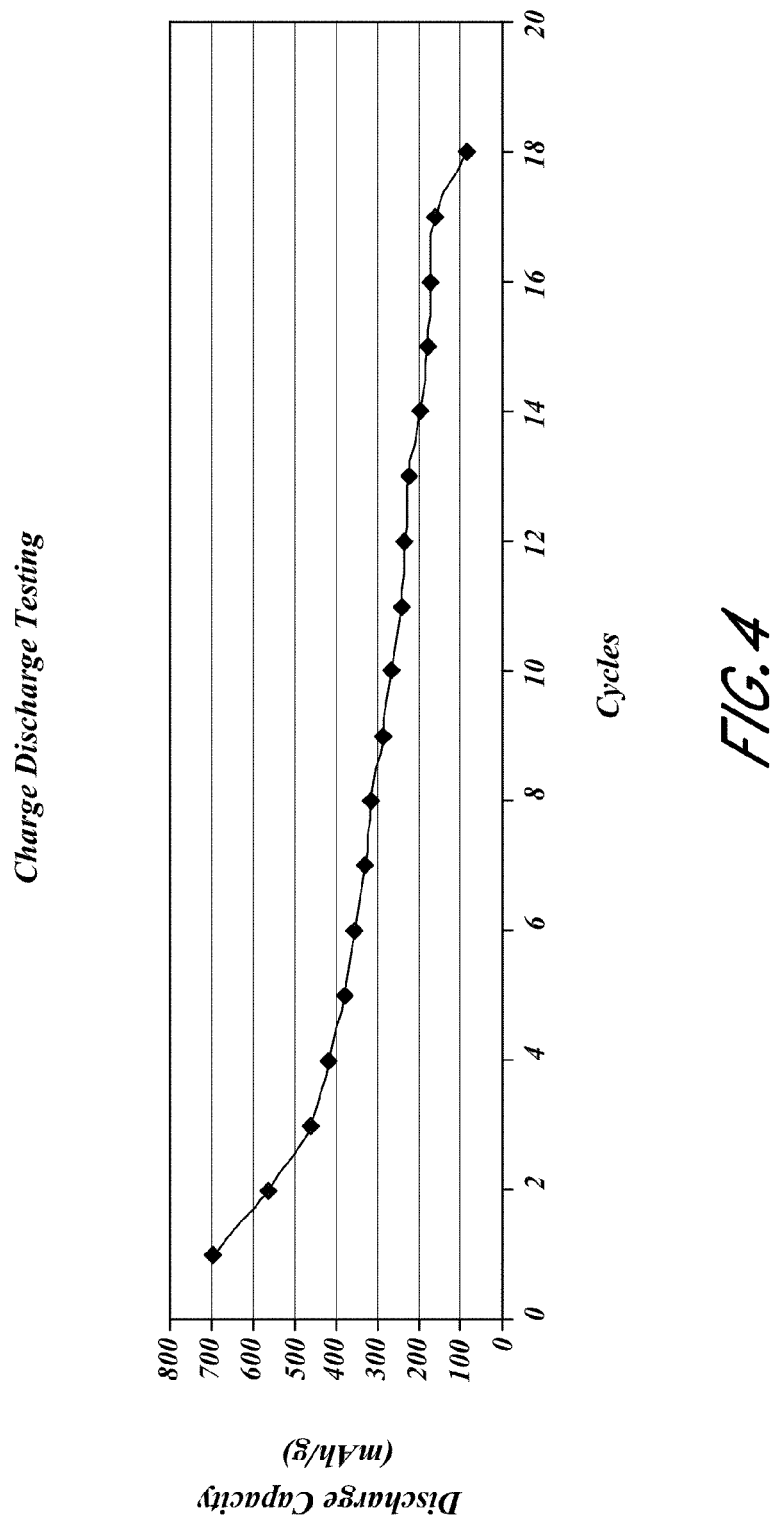
FIG. 4 is a plot of the discharge capacity at an average rate of C/3.3.

The resulting electrodes were then tested in a pouch cell configuration against a lithium NMC Oxide cathode. A typical cycling graph is shown in FIG. 4.

Example 4

In Example 4, silicon microparticles (from Alfa Aesar corp.), polyimide liquid precursor (PI 2611 from HD Microsystems corp.), graphite particles (SLP30 from Timcal corp.), milled carbon fibers (from Fibre Glast Developments corp.), carbon nanofibers (CNF from Pyrograf corp.), carbon nanotubes (from CNANO Technology Limited), conductive carbon particles (Super P from Timcal corp.), conductive graphite particles (KS6 from Timca corp.) were mixed in the weight ratio of 20:200:30:8:4:2:1:15 using a vortexer for 5 minutes. The mixture was then cast onto aluminum foil. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1175° C. under argon. The process resulted in a composition similar to the original mixture but with a PI 2611 derived carbon portion that was 7.5% the original weight of the polyimide precursor.

Figure 5:
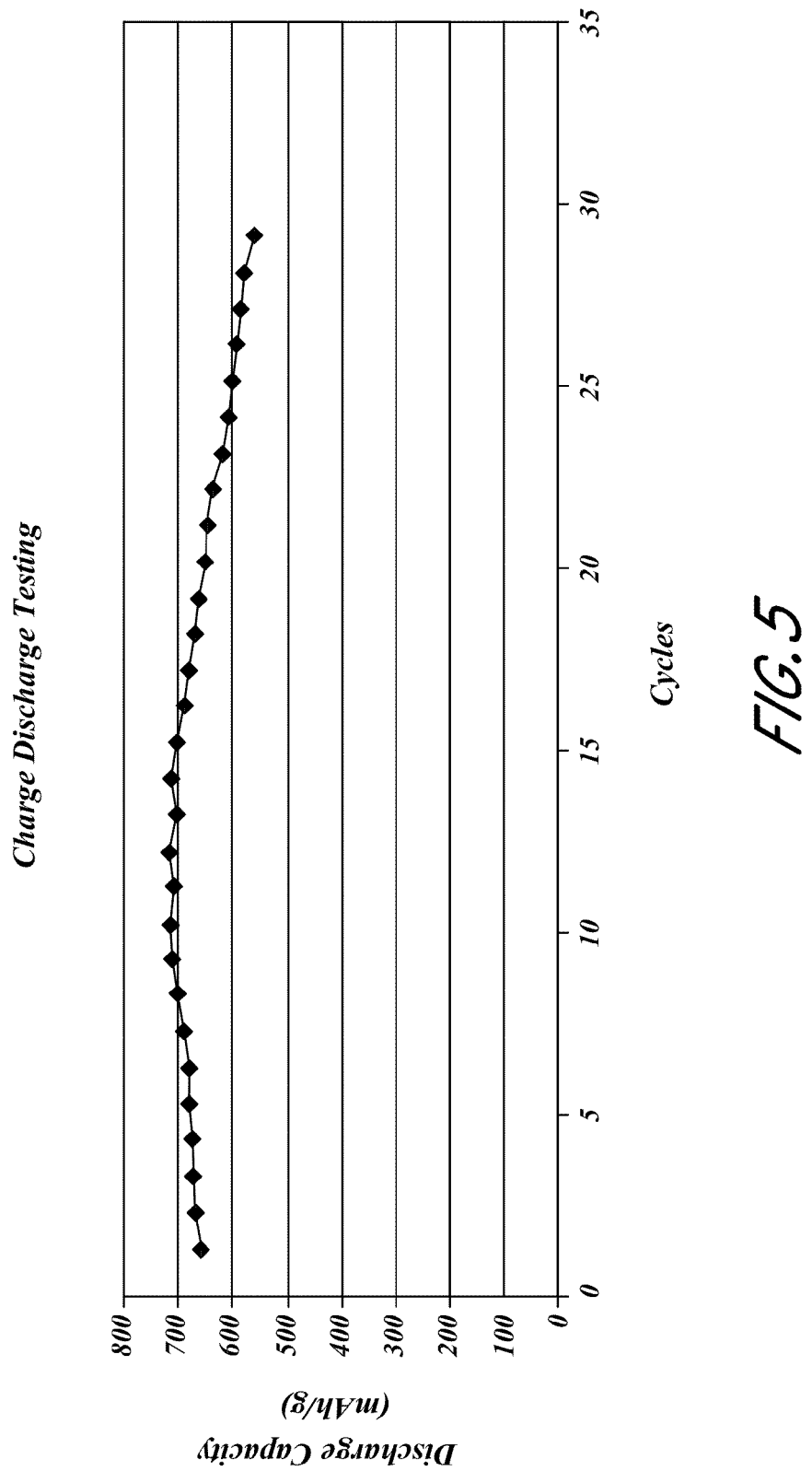
FIG. 5 is a plot of the discharge capacity at an average rate of C/5.

The resulting electrodes were then tested in a pouch cell configuration against a lithium NMC oxide cathode. A typical cycling graph is shown in FIG. 5.

Example 5

In Example 5, polyimide liquid precursor (PI 2611 from HD Microsystems corp.), and silicon microparticles (from Alfa Aesar corp.) were mixed together using a Turbula mixer for a duration of 1 hours in the weight ratio of 4:1. The mixture was then cast onto aluminum foil covered with a carbon veil (from Fibre Glast Developments Corporation) and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of approximately 23% of PI 2611 derived carbon, 76% of silicon by weight, and the weight of the veil being negligible.

Figure 6:
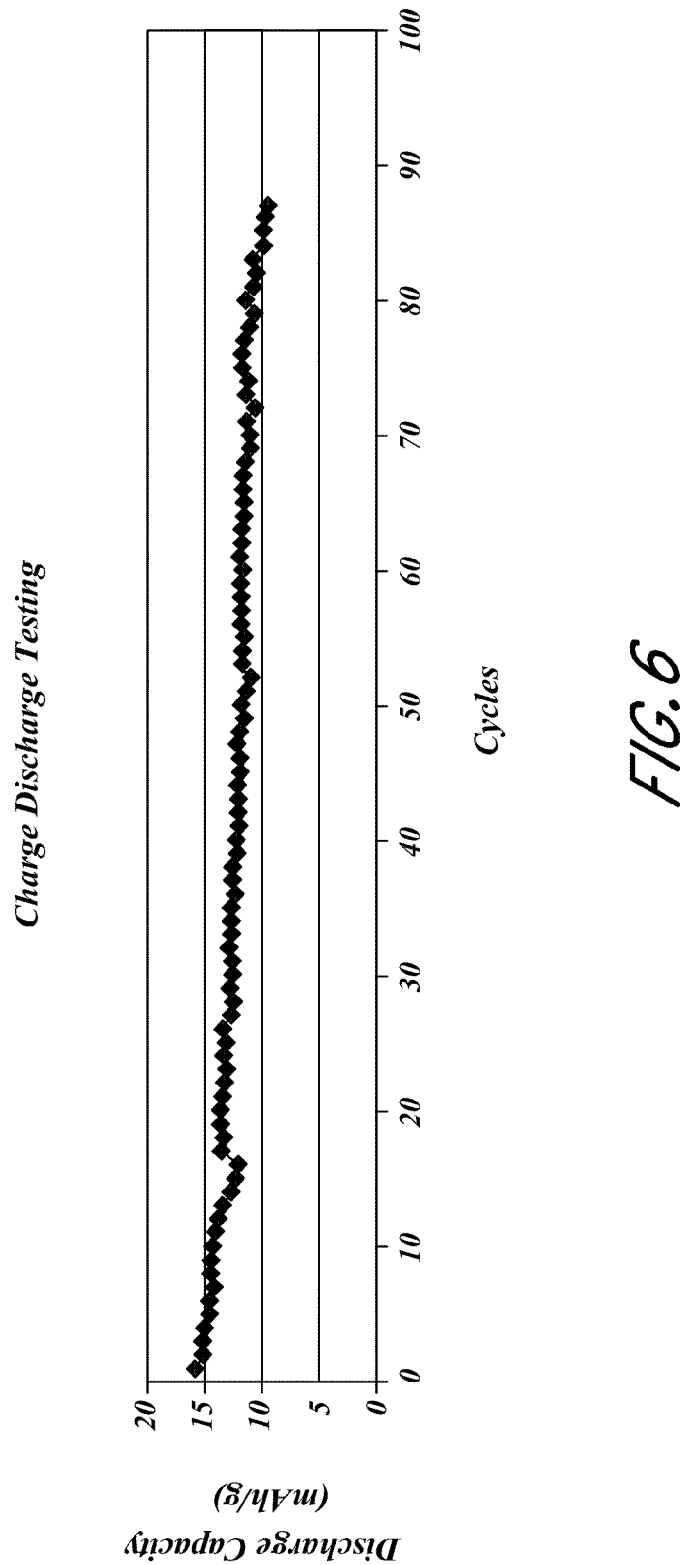
FIG. 6 is a plot of the discharge capacity at an average rate of C/9.

The resulting electrodes were then tested in a pouch cell configuration against a lithium nickel manganese cobalt oxide (NMC) cathode. A typical cycling graph is shown in FIG. 6.

Example 6

In Example 6, polyimide liquid precursor (PI 2611 from HD Microsystems corp.), graphite particles (SLP30 from Timcal corp.), and silicon microparticles (from Alfa Aesar corp.) were mixed together for 5 minutes using a Spex 8000D machine in the weight ratio of 200:10:70. The mixture was then cast onto aluminum foil and allowed to dry in a 90° C. oven, to drive away solvents (e.g., NMP). The dried mixture was cured at 200° C. in a hot press, under negligible pressure, for at least 12 hours. The aluminum foil backing was then removed by etching in a 12.5% HCl solution. The remaining film was then rinsed in DI water, dried and then pyrolyzed at 1175° C. for about one hour under argon flow. The process resulted in a composition of 15.8% of PI 2611 derived carbon, 10.5% of graphite particles, 73.7% of silicon by weight.

Figure 7:
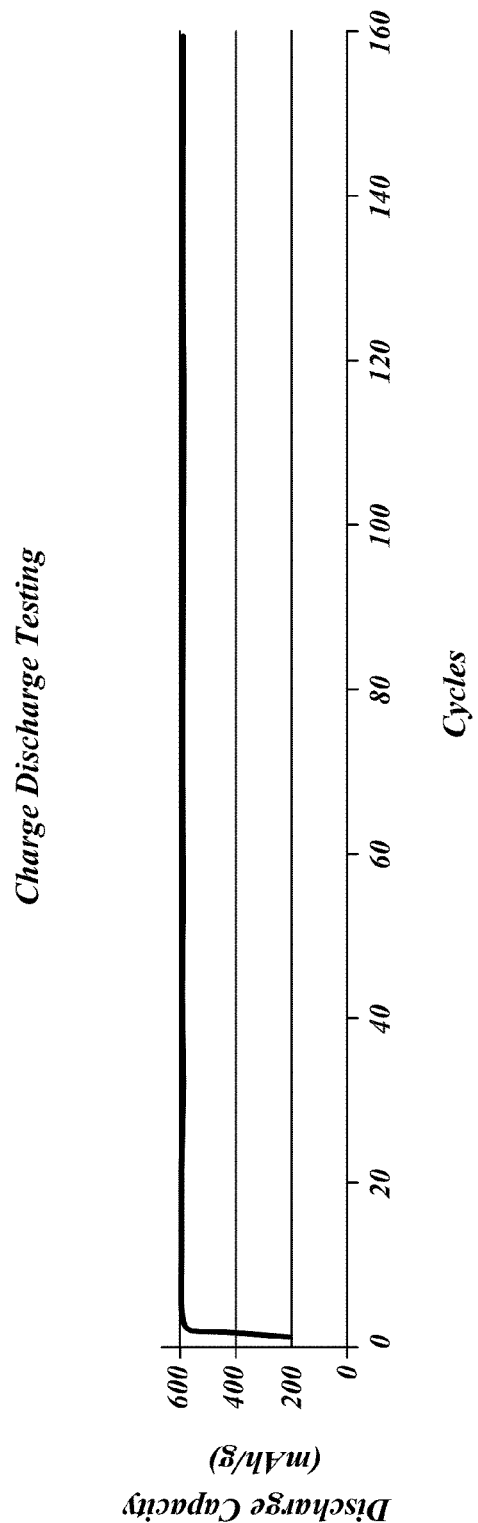
FIG. 7 is a plot of the discharge capacity.

The resulting electrodes were then tested in a pouch cell configuration against a lithium NMC oxide cathode. The anodes where charged to 600 mAh/g each cycle and the discharge capacity per cycle was recorded. A typical cycling graph is shown in FIG. 7.

Example 7

Figure 8:
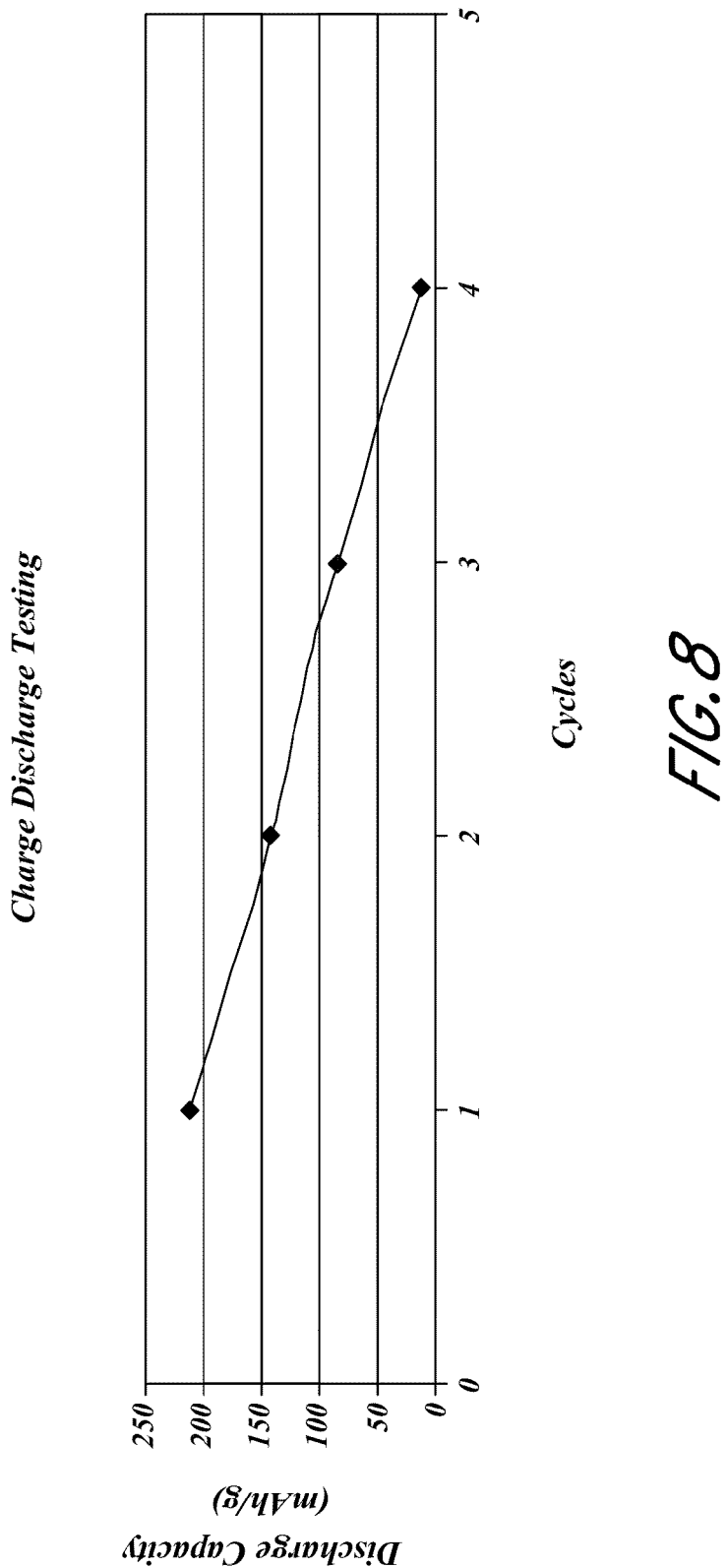
FIG. 8 is a plot of the discharge capacity at an average rate of C/9.

In Example 7, PVDF and silicon particles (from EVNANO Advanced Chemical Materials Co), conductive carbon particles (Super P from Timcal corp.), conductive graphite particles (KS6 from Timcal corp.), graphite particles (SLP30 from Timcal corp.) and NMP were mixed in the weight ratio of 5:20:1:4:70:95. The mixture was then cast on a copper substrate and then placed in a 90° C. oven to drive away solvents, e.g., NMP. The resulting electrodes were then tested in a pouch cell configuration against a lithium NMC Oxide cathode. A typical cycling graph is shown in FIG. 8.

Example 8

Multiple experiments were conducted in order to find the effects of varying the percentage of polyimide derive carbon (e.g. 2611c) while decreasing the percentage of graphite particles (SLP30 from Timcal corp.) and keeping the percentage of silicon microparticles (from Alfa Aesar corp.) at 20 wt. %.

Figure 9A:
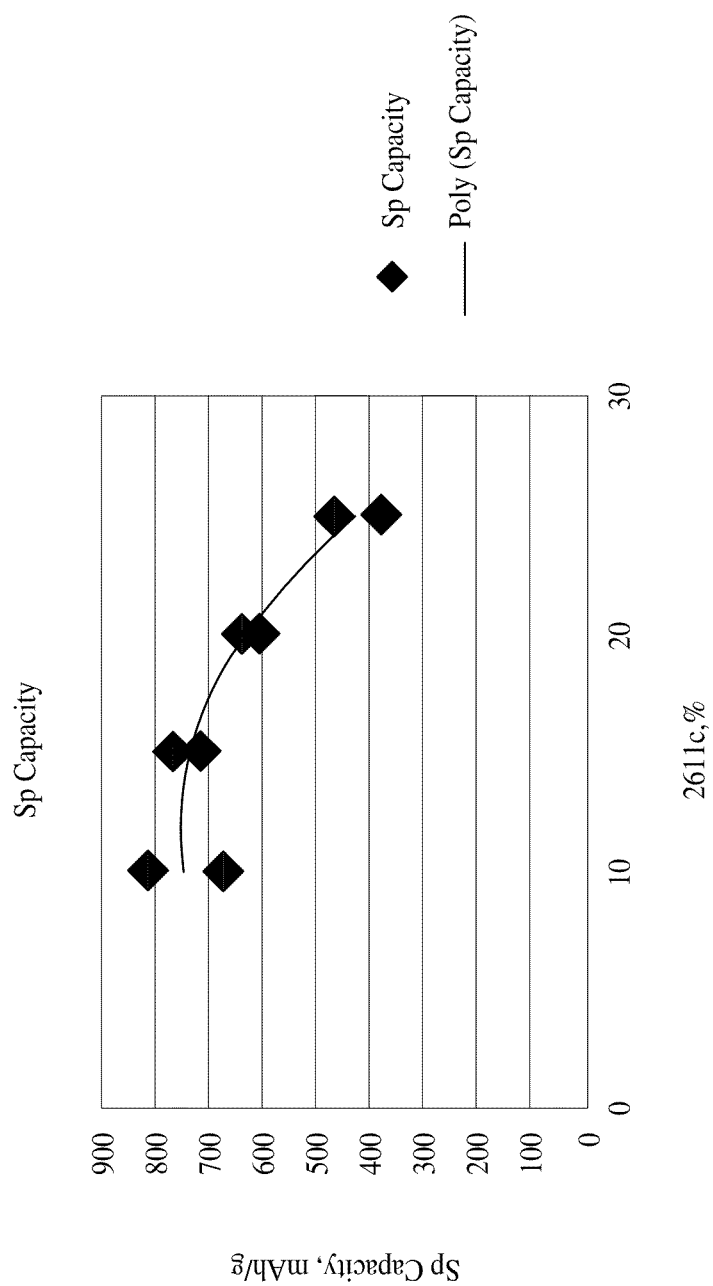
FIGS. 9A and 9B are plots of the reversible and irreversible capacity as a function of the various weight percentage of PI derived carbon from 2611c and graphite particles for a fixed percentage of 20 wt. % Si.
Figure 9B:
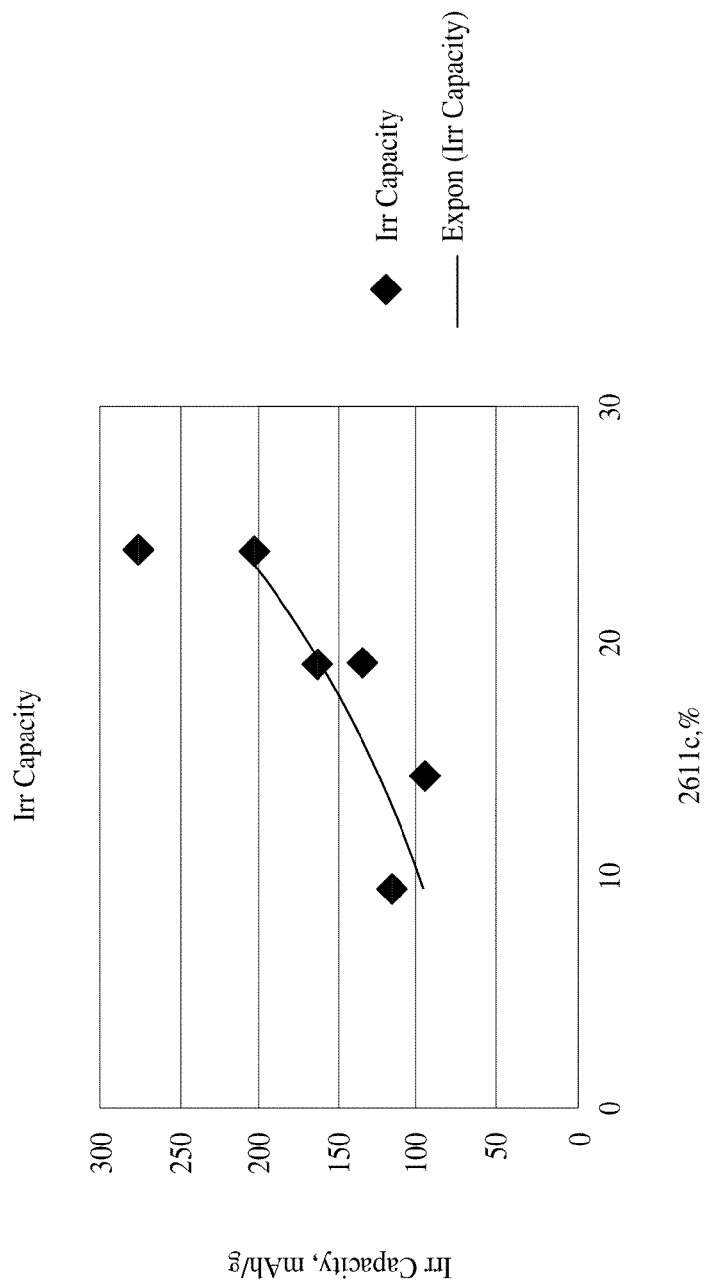

As shown in FIGS. 9A and 9B, the results show that more graphite and less 2611c was beneficial to cell performance by increasing the specific capacity while decreasing the irreversible capacity. Minimizing 2611c adversely affected the strength of the resultant anode so a value close 20 wt. % can be preferable as a compromise in one embodiment.

Example 9

Figure 10:
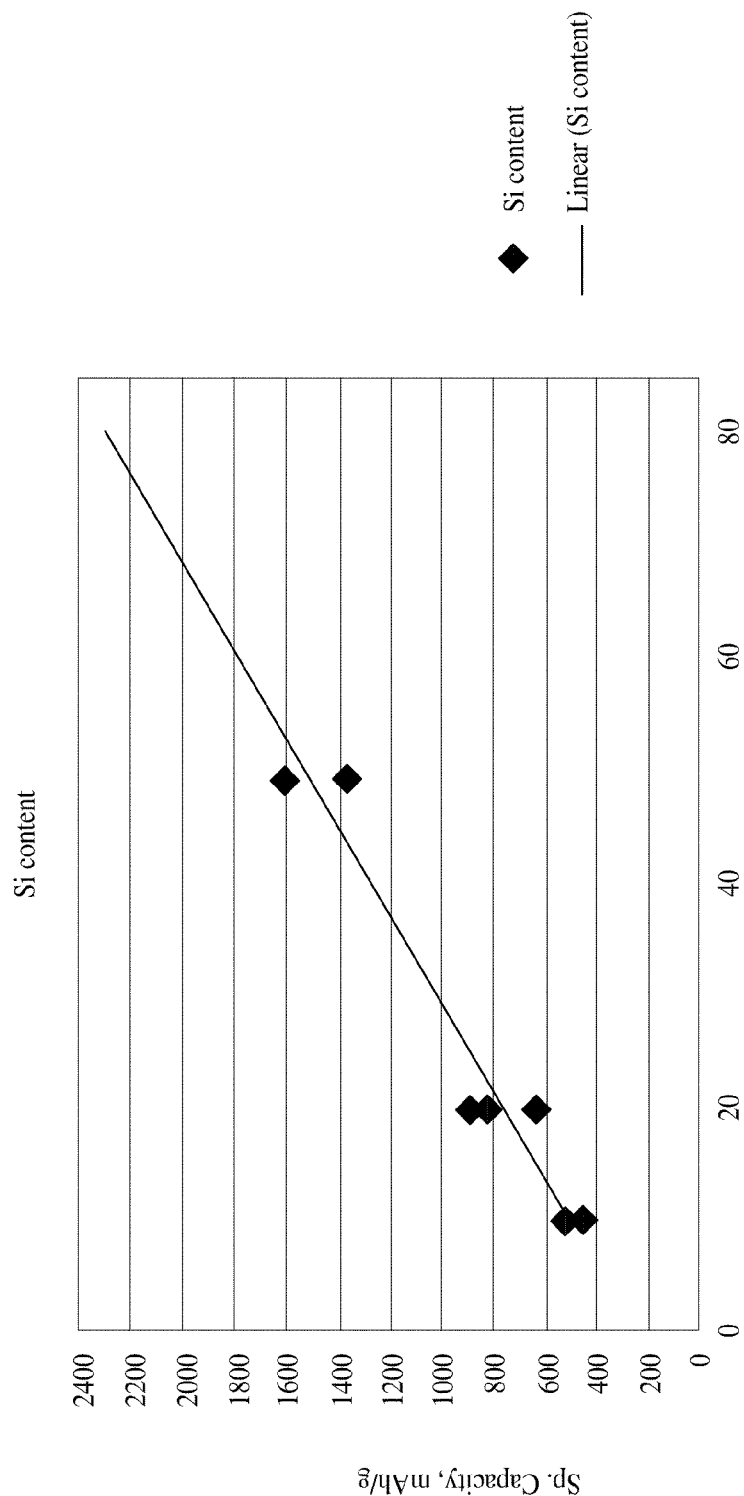
FIG. 10 is a plot of the first cycle discharge capacity as a function of weight percentage of carbon.

Similarly to example 8, if 2611c is kept at 20 wt. % and Si percentage is increased at the expense of graphite particles, the first cycle discharge capacity of the resulting electrode is increased. FIG. 10 shows that a higher silicon content can make a better performing anode.

Example 10

Figure 11:
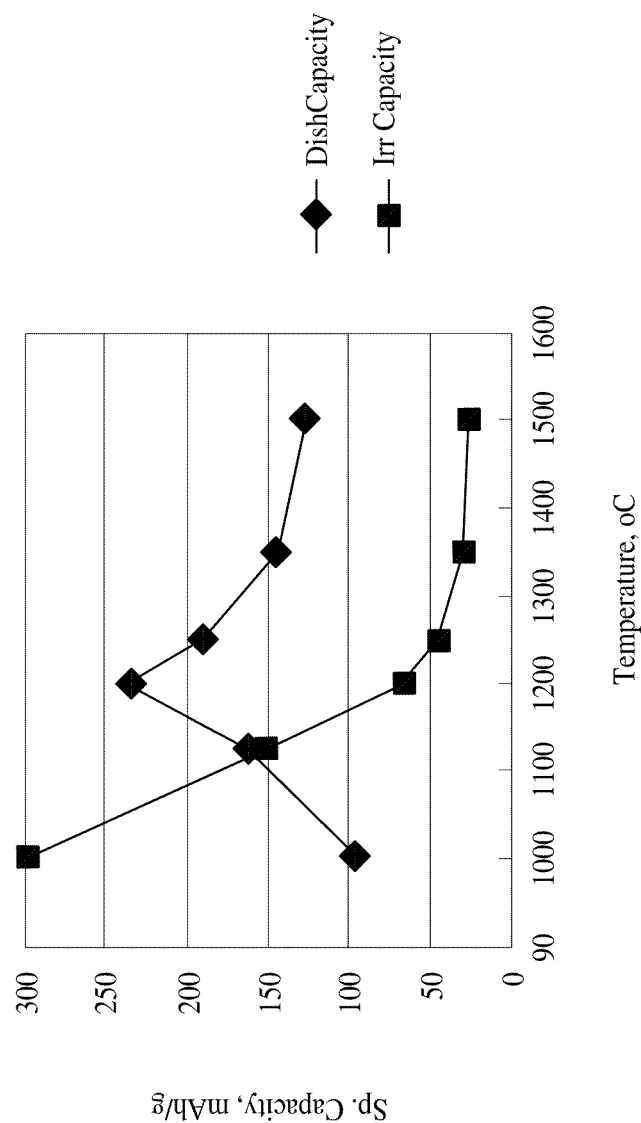
FIG. 11 is a plot of the reversible (discharge) and irreversible capacity as a function of pyrolysis temperature.

When 1 mil thick sheets of polyimide are pyrolized and tested in accordance with the procedure in Example 1. The reversible capacity and irreversible capacity were plotted as a function of the pyrolysis temperature. FIG. 11 indicates that, in one embodiment, it is preferable to pyrolyze polyimide sheets (Upilex by UBE corp) at around 1175° C.

Additional Examples

Figure 12:
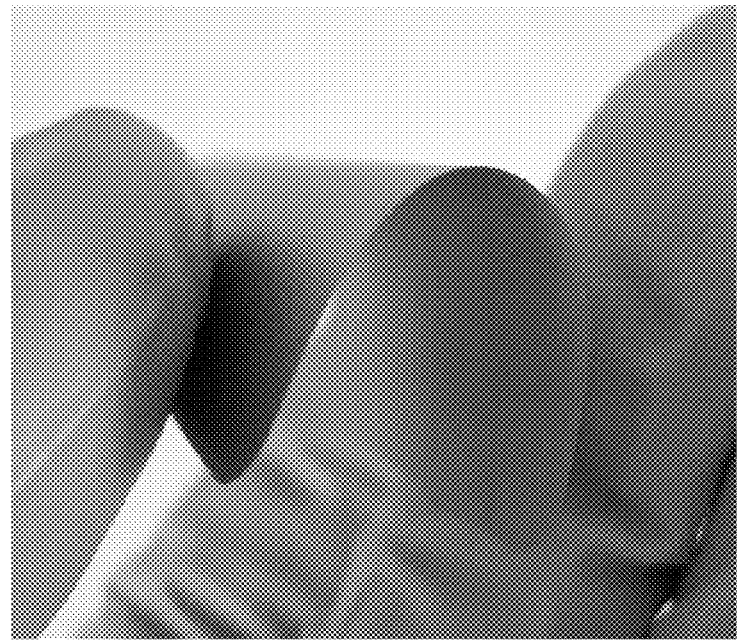
FIG. 12 is a photograph of a 4.3 cm×4.3 cm composite anode film without a metal foil support layer.

FIG. 12 is a photograph of a 4.3 cm×4.3 cm composite anode film without a metal foil support layer. The composite anode film has a thickness of about 30 microns and has a composition of about 15.8% of PI 2611 derived carbon, about 10.5% of graphite particles, and about 73.7% of silicon by weight.

Figure 13:
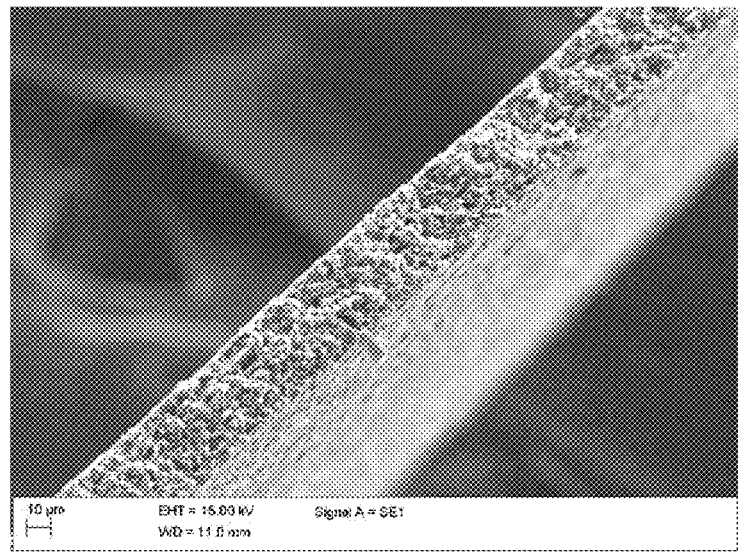
FIG. 13 is a scanning electron microscope (SEM) micrograph of a composite anode film before being cycled (the out-of-focus portion is a bottom portion of the anode and the portion that is in focus is a cleaved edge of the composite film)
Figure 14:
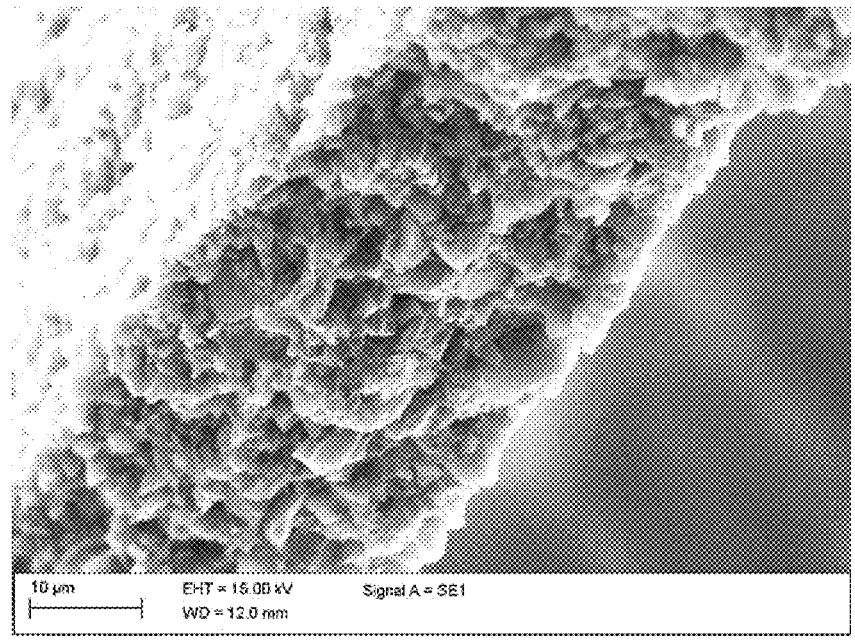
FIG. 14 is another SEM micrograph of a composite anode film before being cycled.
Figure 15:
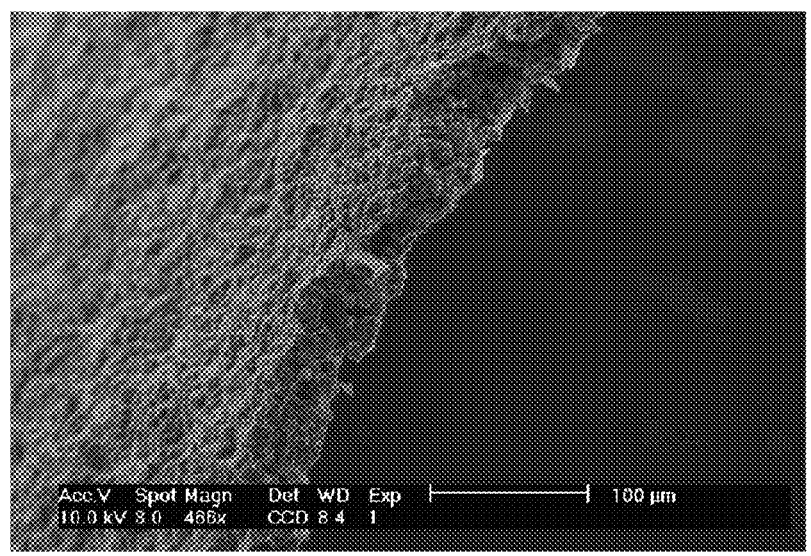
FIG. 15 is a SEM micrograph of a composite anode film after being cycled 10 cycles.
Figure 16:
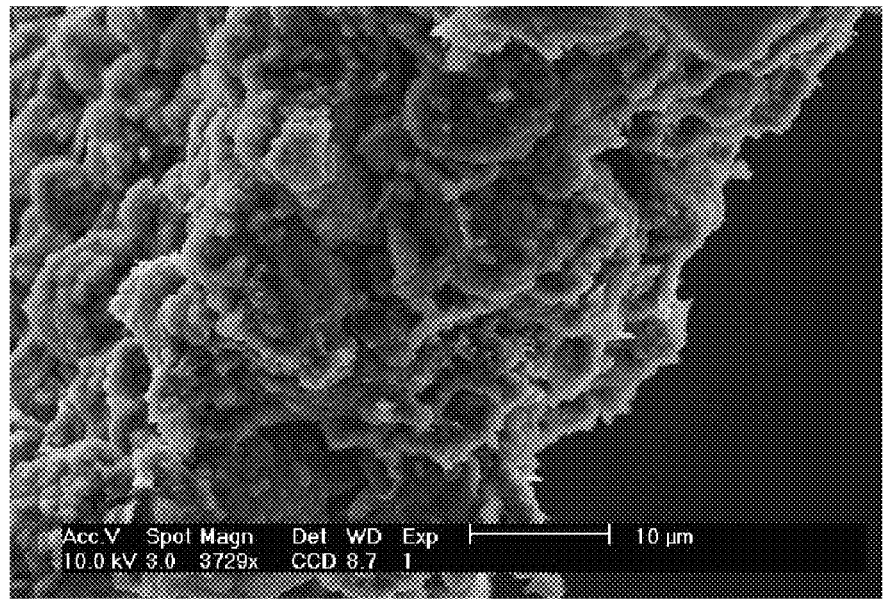
FIG. 16 is another SEM micrograph of a composite anode film after being cycled 10 cycles.
Figure 17:
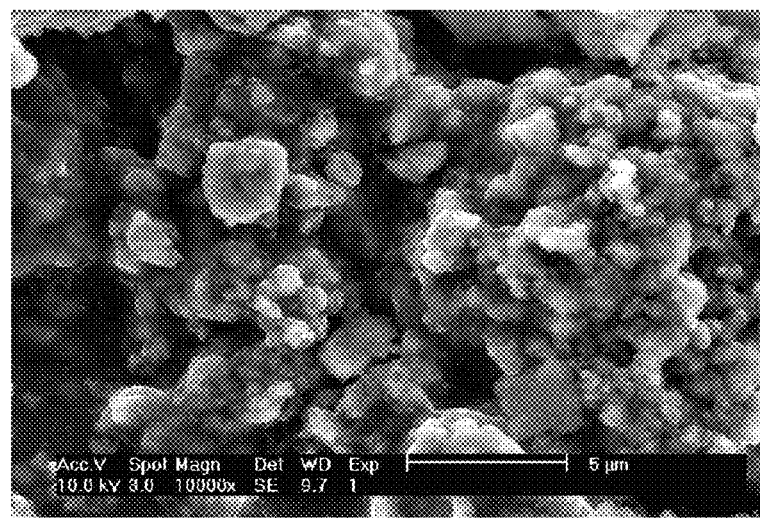
FIG. 17 is a SEM micrograph of a composite anode film after being cycled 300 cycles.
Figure 18:
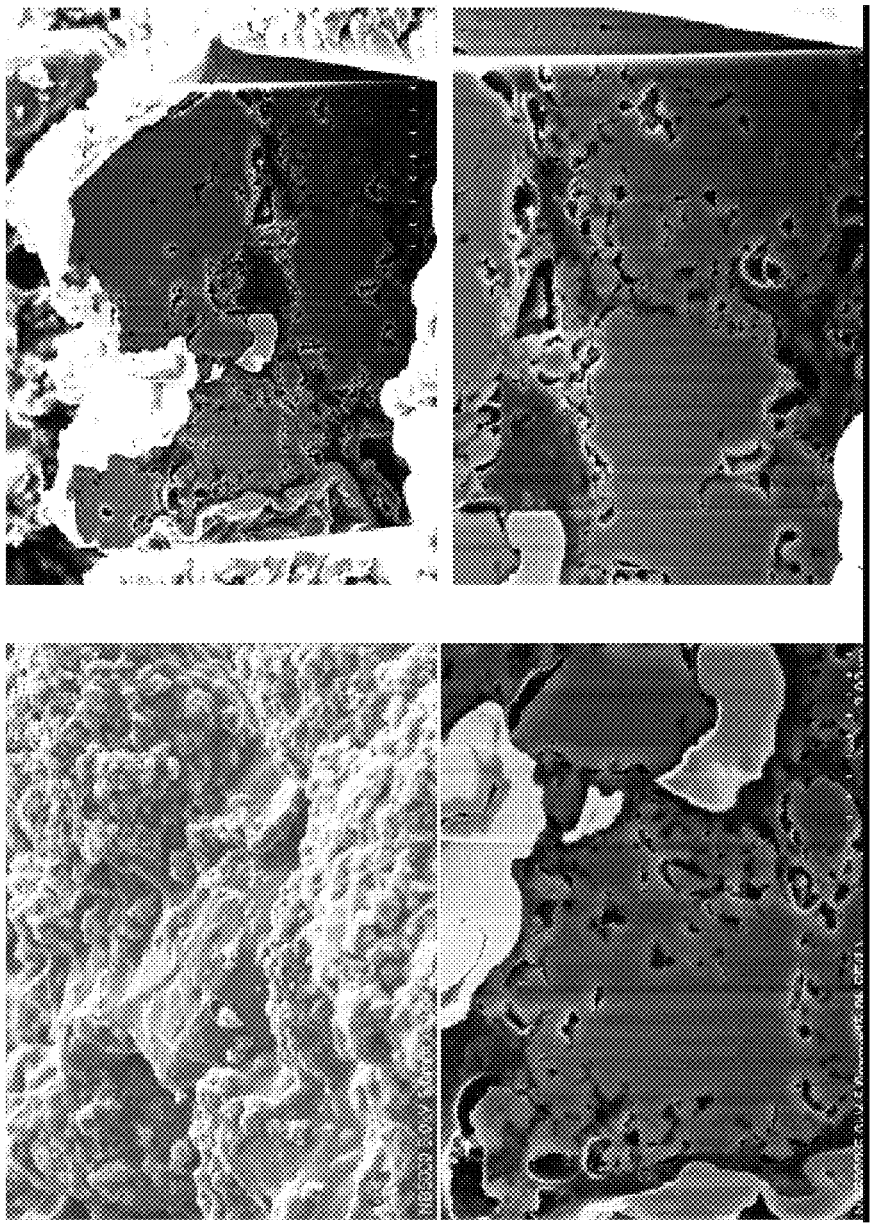
FIG. 18 includes SEM micrographs of cross-sections of composite anode films.

FIGS. 13-18 are scanning electron microscope (SEM) micrographs of a composite anode film. The compositions of the composite anode film were about 15.8% of PI 2611 derived carbon, about 10.5% of graphite particles, and about 73.7% of silicon by weight. FIGS. 13 and 14 show before being cycled (the out-of-focus portion is a bottom portion of the anode and the portion that is in focus is a cleaved edge of the composite film). FIGS. 15, 16, and 17 are SEM micrographs of a composite anode film after being cycled 10 cycles, 10 cycles, and 300 cycles, respectively. The SEM micrographs show that there is not any significant pulverization of the silicon and that the anodes do not have an excessive layer of solid electrolyte interface/interphase (SEI) built on top of them after cycling. FIG. 18 are SEM micrographs of cross-sections of composite anode films.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A composite material film comprising:
   greater than 0% and less than about 90% by weight of silicon particles;
   greater than 0% and less than about 90% by weight of one or more types of carbon phases, wherein at least one of the one or more types of carbon phases is a substantially continuous phase that holds the composite material film together such that the silicon particles are distributed throughout the composite material film; and
   wherein the composite material film is self-supported.

2. The composite material film of claim 1, wherein the silicon particles have an average largest dimension less than about 1 μm.

3. The composite material film of claim 1, comprising about 20% to about 80% of the silicon particles by weight.

4. The composite material film of claim 1, wherein the at least one of the one or more types of carbon phases that is a substantially continuous phase is electrochemically active and electrically conductive.

5. The composite material film of claim 1, wherein the at least one of the one or more types of carbon phases that is a substantially continuous phase comprises hard carbon.

6. The composite material film of claim 1, wherein the one or more types of carbon phases comprises graphite particles.

7. The composite material film of claim 1, further comprising conductive particles.

8. The composite material film of claim 1, further comprising metal particles.

9. The composite material film of claim 1, wherein the composite material film is substantially electrochemically active.

10. A battery electrode comprising the composite material film of claim 1.

11. A method of using the composite material film of claim 1, comprising using the composite material film only at a gravimetric capacity less than about 70% of a maximum gravimetric capacity of the composite material film.

12. A method of forming the composite material film of claim 1 comprising:
   providing a mixture comprising a precursor and silicon particles; and
   pyrolysing the precursor to convert the precursor into the one or more types of carbon phases to form the composite material film.

13. The method of claim 12, wherein after pyrolysing the precursor, the mixture forms a self-supported composite structure.

14. The method of claim 12, wherein the at least one of the one or more types of carbon phases that is a substantially continuous phase comprises hard carbon.

15. The method of claim 12, wherein the composite material film comprises about 20% to about 80% of the silicon particles by weight.

16. The method of claim 12, wherein the mixture further comprises a solvent.

17. The method of claim 12, wherein the precursor comprises a polyimide.

18. The method of claim 12, wherein the precursor comprises a phenolic resin.

19. The method of claim 12, wherein the precursor comprises a hydrocarbon compound.

20. The method of claim 12, wherein the mixture comprises greater than 0% and less than about 80% of the silicon particles by weight, and about 5% to about 80% of precursor by weight.

21. The method of claim 12, further comprising:
casting the mixture on a substrate;
drying the mixture to form a film;
removing the film from the substrate; and
curing the film in a hot press.

22. The method of claim 12, further comprising forming a battery electrode from the composite material film.

23. The composite material film of claim 1, wherein the silicon particles are homogenously distributed throughout the composite material film.

24. The composite material film of claim 1, wherein the silicon particles are in contact with the substantially continuous phase.

* * * * *

UNITED STATES PATENT AND TRADEMARK OFFICE
CERTIFICATE OF CORRECTION

PATENT NO. : 9,178,208 B2
APPLICATION NO. : 13/008800
DATED : November 3, 2015
INVENTOR(S) : Park et al.

It is certified that error appears in the above-identified patent and that said Letters Patent is hereby corrected as shown below:

On the title page item [73], Change "EVEVATE" to --ENEVATE--.

In the claims

Column 12, line 66, Claim 20, after "80% of" insert --the--.

Signed and Sealed this
Twenty-first Day of June, 2016

Michelle K. Lee
*Director of the United States Patent and Trademark Office*